United States Patent

[11] 3,598,499

[72] Inventor James A. Dillon, Jr.
 24749 Panama, Warren, Mich. 48901
[21] Appl. No 814,582
[22] Filed Apr. 9, 1969
[45] Patented Aug. 10, 1971

[54] BORING HEAD ASSEMBLY
 3 Claims, 4 Drawing Figs.
[52] U.S. Cl.................................................. 408/148,
 29/105, 408/150, 408/153
[51] Int. Cl................................................ B23b 29/03
[50] Field of Search......................................... 29/105;
 82/36; 77/58, 58.3, 58.36, 58.37, 58.38

[56] References Cited
UNITED STATES PATENTS
| | | | |
|---|---|---|---|
| 1,820,056 | 8/1931 | Drowns................. | 77/58 |
| 2,096,472 | 10/1937 | Schmidt................ | 29/105 |
| 2,412,937 | 12/1946 | Allen..................... | 77/58 |
| 3,274,862 | 9/1966 | Babich et al........... | 77/58 |
| 3,408,885 | 11/1968 | Mendenhall............ | 77/58 |
| 3,477,320 | 11/1969 | Findley.................. | 82/36 |
| 2,398,491 | 4/1946 | Bell....................... | 29/105 |

OTHER REFERENCES
Publication: Everede Catalog BH 2-66; received in Patent Office 12-12-66; copy in class 77, sub 58.

Primary Examiner—Gerald A. Dost
Attorney—Whittemore, Hulbert & Belknap

ABSTRACT: A boring head assembly comprising a head having a radially extending slot, and a removable blade-carrying slide adjustably mounted in the slot. A reference block is also adjustably mounted in the slot having a locating surface adapted to contact and radially locate the slide. A microscrew carried by the block provides a second slide-locating surface.

PATENTED AUG 10 1971
3,598,499
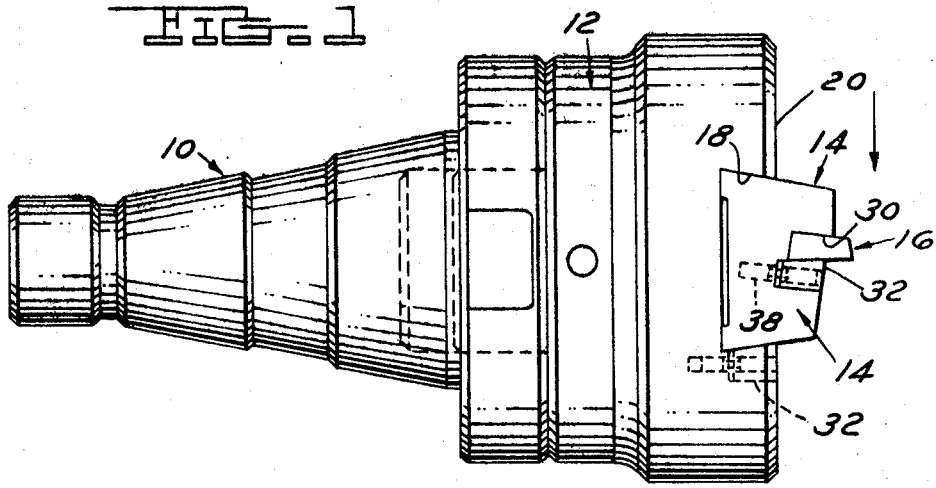
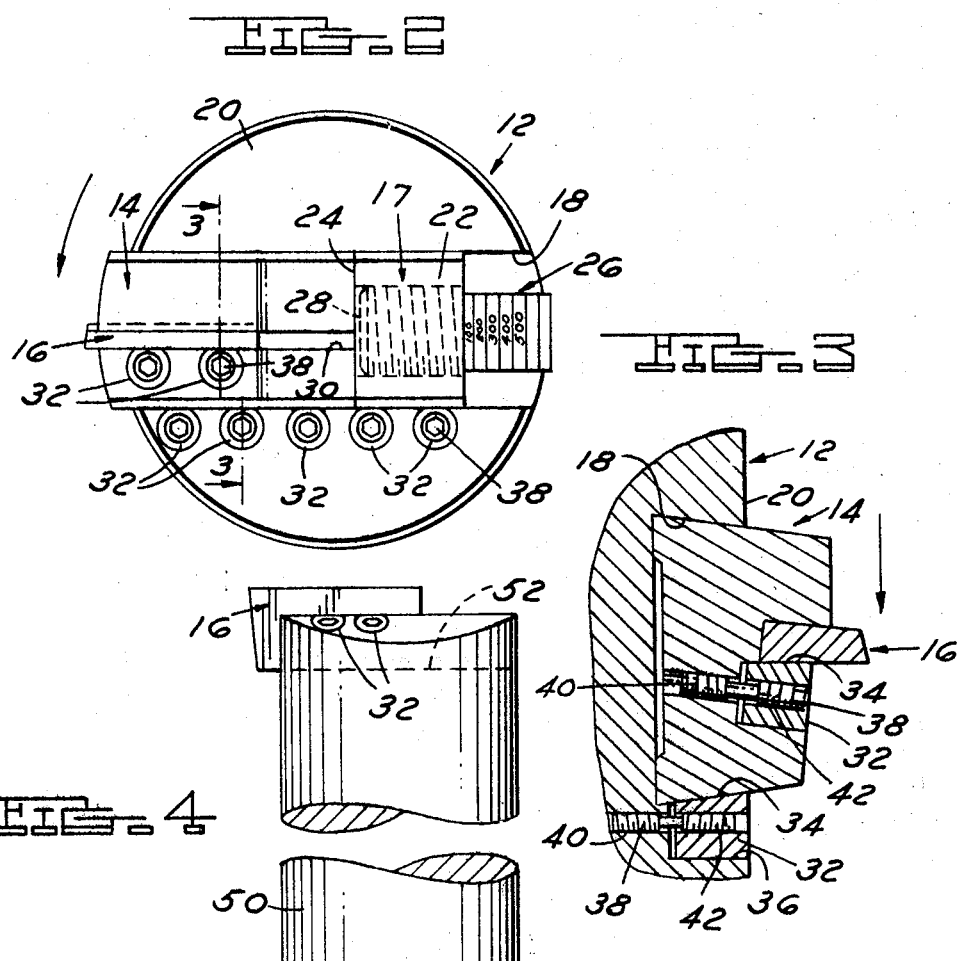
INVENTOR
JAMES A. DILLON, JR.
BY
Whittemore, Hulbert & Belknap
ATTORNEYS 3,598,499

BORING HEAD ASSEMBLY

SUMMARY OF THE INVENTION

One object of this invention is to provide a boring head assembly of improved construction and which is less expensive and much more versatile than standard boring bars now on the market.

Another object is to provide a boring head assembly which is simple and rugged in construction and has a wide range and capacity, while retaining a high degree of accuracy.

Another object is to provide a boring head assembly having a head provided with a radial slot for removably mounting one of several different blade-carrying slides.

Another object is to provide a boring head assembly in which the head is provided with a reference point so that different diameter holes may be readily bored by inserting blade-carrying slides into the head against the reference point.

Another object is to provide a boring head assembly having a reference block adjustably mounted on the head and having a locating surface adapted to contact and locate the slide.

Another object is to provide the reference block with a microscrew for fine adjustment.

Another object is to provide a boring head assembly wherein different blade-carrying slides may be employed in the same boring heads and the heads are removably secured to the shanks allowing the same tools to be used on many different machines.

Another object is to provide a boring head assembly having wedge-type holding devices for the slides and blades, providing maximum holding power.

Another object is to provide a boring head assembly having a head adapted for all types of mounting such, for example, as a tapered shank, straight shank, or flange mounting.

Other objects and features of the invention will become apparent as the description proceeds, especially when taken in conjunction with the accompanying drawing wherein:

FIG. 1 is a side elevational view of a boring head assembly embodying my invention.

FIG. 2 is an end elevational view of the boring head assembly shown in FIG. 1, as viewed from the right.

FIG. 3 is a fragmentary sectional view taken on the line 3-3 in FIG. 2.

FIG. 4 is an elevational view with parts broken away of a modification of the invention.

Referring now more particularly to the drawing and especially to FIGS. 1—3, the boring head assembly comprises a shank 10, a head 12, an elongated slide 14, a blade 16, and a reference microblock assembly 17.

The head 12 is removably secured to the shank 12 in any suitable manner as by a threaded connection. The shank is engaged in a boring machine in a conventional manner to rotate the boring head assembly. The separate shank allows the same tool to be used on many different machines.

The head has a radially extending, dovetail slot 18 extending across its axially outer surface 20. This slot 18 is preferably open at both ends.

The slide 14 has the same cross section as and fits slidably in the dovetail slot 18.

The microblock assembly 17 includes a microblock 22 which has the same cross section as and fits slidably in the dovetail slot 18. The radially outer surface 24 of the microblock 22 is a slide-locating or reference surface adapted to be contacted by the inner end of slide 14 to accurately locate the slide in the slot. The surface 24 is preferably a plane surface which is disposed parallel to the central longitudinal axis of the head.

The microblock 17 has a threaded bore extending lengthwise of the slot 18, and a calibrated microscrew 26 threads into the bore. The radially outer end 28 of the microscrew also provides a slide-locating or reference surface when it is extended radially outwardly beyond the locating surface 24 of the microblock 17. The microscrew 26 is shown in its retracted position in FIG. 2 withdrawn radially inwardly with respect to the reference surface 24 of the microblock.

The slide 14 has an elongated slot 30 in its outer surface which extends lengthwise of the slide or radially with respect to the head. THis slot 30 is dovetailed in cross section and the blade 16 is of the same dovetailed cross section and is slidably received in the slot.

Wedges 32 are provided for locking the slide 14 and the block 22 in adjusted position lengthwise of the slot. These wedges 32 have inclined surfaces 34 complementary in slope to the adjacent side surfaces of the slide 14 and block 22 and are disposed in sockets 36 which open into the slot 18 so that the sides 34 of the wedges bear against the adjacent sides of the slide and block. Screws 38 extend generally parallel to the axis of the head 12 and thread into the head as well as through the wedges. The portions 40 of the screws in the head are threaded oppositely to the portions 42 through the wedges so that when the screws are tightened the wedges are drawn down into the sockets 36 to impose a firm wedging contact between the surfaces 34 of the wedges and the slide and block. This presses the slide and block laterally against the opposite sidewall of the slot 18 and wedge locks them firmly in adjusted position.

Wedges 32 are also employed to lock the blade 16 in its slot 30 which wedges are identical to the wedges for locking the slide 14 and microblock 22 in slot 16. Accordingly, the wedges 32 for the blade 16 and the associated sockets and screws are identified by the same characters of reference.

The arrows in FIGS. 1—3 indicate the direction of rotation and it will be apparent that the forces on the blade during boring tend to lift it up out of the slide. The same lifting force is applied to the slide. These forces are resisted by the wedges 32.

When a series of different diameter holes are to be bored, a series of slides 14 may be selected and their blades 16 adjusted as required to bore the individual holes, and then these separate slides may be successively installed in the head 12 up against the reference or locating surface 24 of the microblock in the position illustrated in FIG. 2 to bore holes of the proper diameter. After the blades in the individual slides have been wedge locked in proper position, and the microblock 22 wedge locked in its proper position, the slides may be individually inserted into the slot 18 up against the reference surface 24 without any further adjustment and locked in position for the boring operation.

Should it be desired to operate the boring head in a more or less conventional fashion by adjusting a single slide radially in and out for different diameter cuts, this can be accomplished by the use of the microscrew 26, projecting its reference or locating surface 28 radially outwardly beyond the reference surface 24 of the microblock to provide an adjustable reference surface for the slide.

The microblock 22 is locked in adjusted position at any desired point, such for example, as 0.75 inches from the axial center of the head.

In order to calibrate a particular head to take account of possible runout for example, a slide may be selected to bore a 5-inch hole. For this purpose a slide having a length from the tip of the blade to the opposite end of the slide of 3.125 inches may be used and the microscrew adjusted to project the reference surface 28 0.100 inches beyond the reference surface 24 of the microblock. Considering the offset of the reference surface 24 of 0.75 inches from the center of the head, the slide selected, when locked against the projecting screw reference surface 28 should bore a hole 2.475 inches in radius or 4.950 inches in diameter. A semifinish cut may then be taken by adjusting the microscrew to project 0.120 inches, and thereafter by resetting the microscrew to project 0.125 inches a finish cut may be taken which should be exactly 5 inches in diameter. Any variation from this bore size will indicate inherent runout in the machine and the microblock may be loosened and reset to compensate for this difference.

FIG. 4 shows a modification of the invention in which the slide 14 is exactly like the slide 14 shown in FIG. 2, but the blade 16, instead of being mounted directly on the slide is mounted on an elongated bar 50 which extends outwardly from the slide in a direction which would be parallel to the longitudinal axis of the head when the slide is mounted on the head. One end of the bar 50 is rigidly secured to slide 14 and the other end of the bar has a transverse slot 52 which preferably is dovetailed in cross section to slidably receive the blade 16. The slot 52 may be exactly like the slot 30 in the slide 14 shown in FIG. 2, and wedges 32 similar to the wedges in FIG. 2 may be provided for removably locking the blade 16 in the slot 52. The FIG. 4 construction is provided for boring holes of smaller diameter than those which may be bored with the construction shown in FIGS. 1 to 3. It will be understood that the slide 14 in FIG. 4 may be assembled with the boring head 12 exactly as shown in FIGS. 1 to 3.

What I claim as my invention is:

1. A boring head assembly comprising a rotatable head, a generally radially extending slot in said head, a blade assembly comprising a slide and a blade, said slide being removably slidably mounted in said head slot, said slide having a slot extending parallel to said head slot, said blade being slidably mounted in said slide slot, releasable means for securing said blade in said slide slot in adjusted position lengthwise thereof, reference means including a microblock slidably mounted in said head slot, said block having a radially outer locating surface adapted to contact and radially locate said slide, a microscrew threaded through said block and having a locating surface on the outer end thereof, said screw being adjustable with respect to said block by rotation to positions in which said locating surface on the end thereof is retracted radially inwardly of said locating surface on said block and is extended radially outwardly therebeyond to contact and radially locate said slide, releasable means for securing said block in said head slot in finely adjusted position lengthwise thereof, and releasable means for securing said slide in adjusted position in said head slot determined by contact thereof with the locating surface of said block or said screw.

2. The boring head assembly defined in claim 1, wherein said microscrew has calibrations thereon.

3. A boring head assembly comprising a rotatable head, a generally radially extending slot in said head, a blade assembly removably slidably mounted in said slot, reference means including a microblock slidably mounted in said slot, said block having a radially outer locating surface adapted to contact and radially locate said blade assembly, a microscrew threaded through said block and having a locating surface on the outer end thereof, said screw being adjustable with respect to said block by rotation to positions in which said locating surface on the end thereof is retracted radially inwardly of said locating surface on said block and is extended radially outwardly therebeyond to contact and radially locate said blade assembly, releasable means for securing said block in said slot in adjusted position lengthwise thereof, and means for securing said blade assembly in adjusted position in said slot determined by contact thereof with the locating surface of said block or said screw.